Nov. 5, 1946. W. E. WREAD, SR 2,410,592
EMERGENCY BRAKING APPARATUS
Filed Aug. 30, 1944 2 Sheets-Sheet 1
Fig. 1.
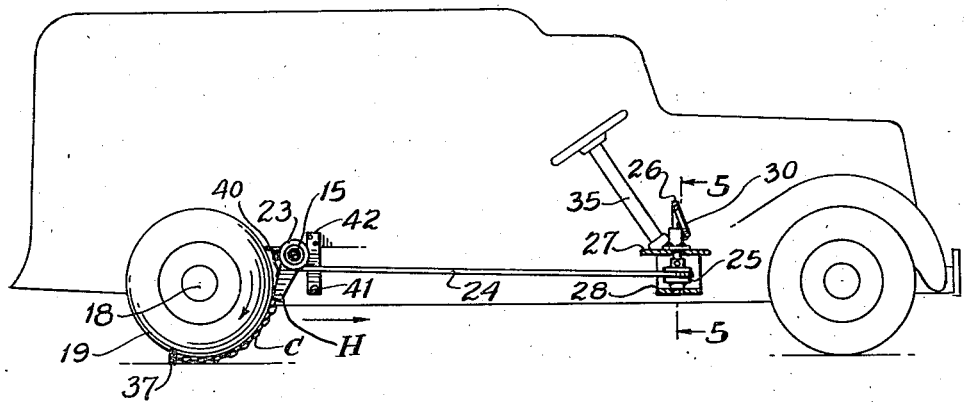
Fig. 2.
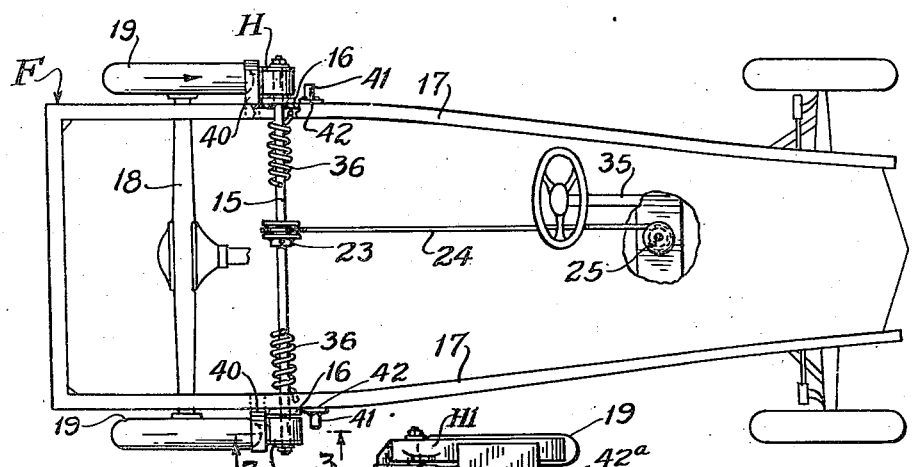
Fig. 7.
Fig. 8.
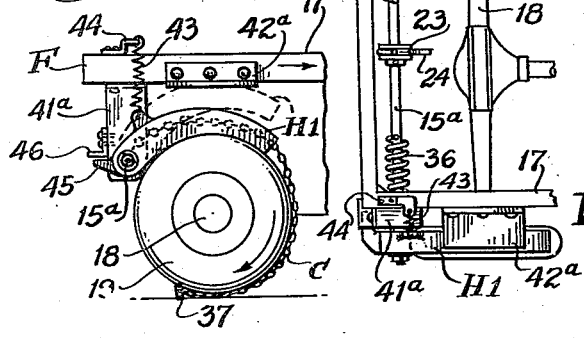
INVENTOR.
WILLIAM E. WREAD, SR.
BY
Edwin Ihuer
ATTORNEY.

Nov. 5, 1946.     W. E. WREAD, SR     2,410,592
EMERGENCY BRAKING APPARATUS
Filed Aug. 30, 1944     2 Sheets-Sheet 2
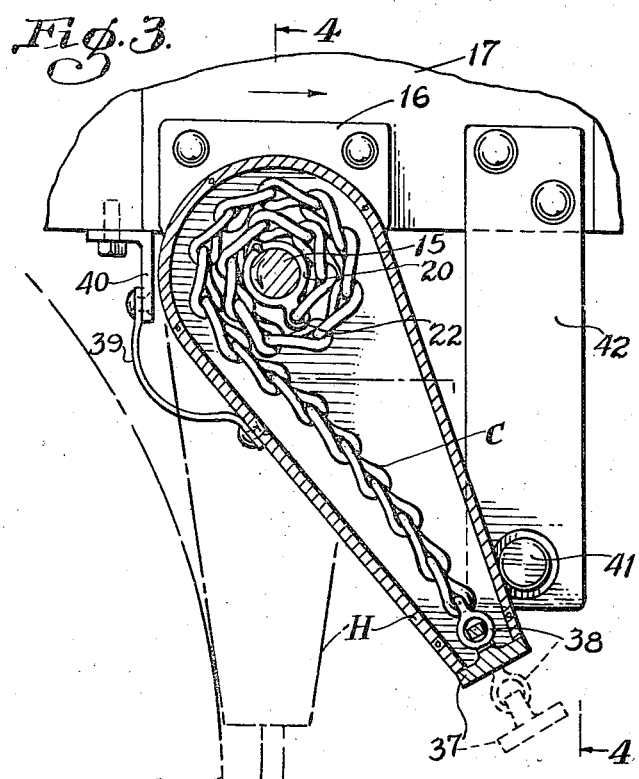
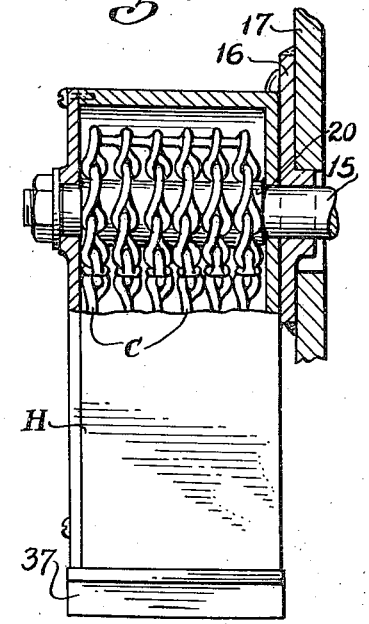
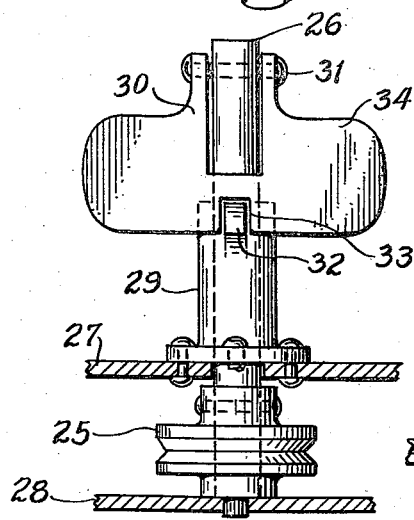
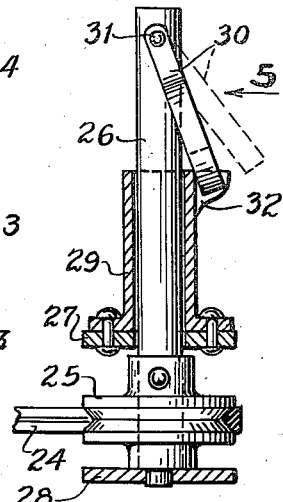
INVENTOR.
WILLIAM E. WREAD, SR.
BY
ATTORNEY.

Patented Nov. 5, 1946

2,410,592

UNITED STATES PATENT OFFICE 2,410,592

EMERGENCY BRAKING APPARATUS

William E. Wread, Sr., Los Angeles, Calif., assignor to Wread Overhead Door Co., Los Angeles, Calif., a corporation Application August 30, 1944, Serial No. 551,803

16 Claims. (Cl. 188—4)

My invention relates to motor trucks and trailers or to any other type of vehicle designed to carry heavy loads. When descending long and steep grades the usual brakes of such vehicles are inadequate to maintain control thereof even when used in conjunction with the engine as an additional braking means. Once control of the vehicle is lost the results obviously are disastrous.

It is a purpose of my invention to provide a braking apparatus adapted to be used only in case of emergency, that is, when the usual brakes are inadequate to maintain the vehicle within control of the operator, and which when used will restore control of the vehicle.

It is also a purpose of my invention to provide an emergency braking apparatus which embodies a skid chain or other equivalent flexible traction means which is so associated with a vehicle wheel that under movement of the wheel it can be brought between the tread of the wheel and the surface of the roadway to brake the wheel against further rotation and thus bring the vehicle to a stop, or at least retard rotation of the wheel so as to bring the vehicle within control of the operator.

A further purpose of my invention is the provision of a braking apparatus which embodies two chains for braking the two rear traction wheels of a vehicle, and in addition a pair of housings in which the chains are normally stored, and which housings are so mounted on the vehicle as to be brought into frictional engagement with the treads of the wheels concurrently with positioning of the chains beneath the wheels, and to thereby provide additional emergency braking means for the vehicle wheels.

Another purpose of my invention is the provision in an emergency braking apparatus of the character described, of a pivotal mounting for the chains and housings so located in respect to the vehicle frame and rear traction wheels that when the housings and chains are set into operation the reactionary forces will tend to lift the vehicle frame rather than lower it thereby eliminating any possible resultant distortion or breaking of the frame resultant of the braking action of the apparatus.

I will describe only two forms of emergency braking apparatus for vehicles, each embodying my invention, and will then point out the novel features thereof in claims.

In the accompanying drawings:

Fig. 1 is a view showing in side elevation and partly in section one form of emergency braking apparatus embodying my invention in applied position on a motor truck, with the latter shown in phantom.

Fig. 2 is a view showing the braking apparatus of Fig. 1 in plan and as applied to the motor truck.

Fig. 3 is an enlarged sectional view taken on the line 3—3 of Fig. 2 with the adjacent vehicle wheel in dash lines.

Fig. 4 is vertical sectional view taken on the line 4—4 of Fig. 3.

Fig. 5 is an enlarged vertical sectional view taken on the line 5—5 of Fig. 1.

Fig. 6 is a view taken at right angles to Fig. 5.

Fig. 7 is a view showing in side elevation another form of emergency braking apparatus embodying my invention applied to the rear traction wheels of a vehicle.

Fig. 8 is a top plan view of the apparatus of Fig. 7 and the vehicle with which it is associated.

Similar reference characters refer to similar parts in each of the several views.

Referring to the form of my invention shown in Figs. 1 to 6, the emergency braking apparatus in this embodiment comprises a shaft 15 journaled in a pair of brackets 16 riveted or otherwise secured to the side members 17 of a motor truck frame F of conventional construction. The mounting of the shaft 15 is such that it extends transversely of the vehicle frame at a point in advance of the rear axle 18 of the vehicle, upon which latter the rear traction wheels 19 are mounted. The opposite ends of the shaft 15 project from the side members 17 and upon these ends reels 20 are secured against rotation and provided with eyes 22 in which the inner ends of a pair of skid chains C are secured so that by rotation of the shaft in a clockwise direction as when viewed in Fig. 3 the chains will be wound upon the reels.

Fixed to the medial portion of the shaft 15 is a grooved drum 23 about which is trained one end of a cable 24, the cable being extended forwardly from the drum, with the other end thereof secured to and trained about a second grooved drum 25. As best shown in Figs. 5 and 6, the drum 25 is keyed to a vertical shaft 26, rotatable in the upper and lower plates 27 and 28 of a suitable frame secured at its ends to the side frame member 17.

Secured to the upper plate 17 is a sleeve 29 through which the shaft 26 extends with its upper projecting end carrying a latch 30 pivoted as at 31 to occupy a latching position in which it is associated with a keeper 32 formed on the sleeve 29. The construction of the latch is such as to provide a recess 33 for the reception of the keeper 32 in a manner to cause the keeper to prevent rotation of the shaft 26 and, hence, rotation of the drum 25. The shaft of the keeper is such as to provide a pair of wings 34 either of which may be struck by the foot of the operator of the motor truck to move the latch free of the keeper 32 so that the shaft 26 is free to rotate.

The structure just described is incorporated in the truck so that the latch 34 is disposed above the floor adjacent the steering column 35 (Fig. 2) so that the operator can kick the latch to released position and manually rotate the shaft 26 through rotation of the keeper.

A pair of torsion springs 36 surround the shaft 15 and are connected to the shaft and to the frame members 17 for urging the shaft in one direction to unwind the chains C from the reels 20. These springs 36 are adapted to be placed under tension through rotation of the shaft in the other direction to wind the chains thereon, and the cable 24 may be actuated to effect such rotation by manual rotation of the shaft 26. It will be understood that to accomplish this the latch 34 is first moved to released position, and then swung upwardly to a vertical position in which it provides a handle by which the shaft 26 can be rotated to wind the cable on the drum 25 thereby rotating the drum 23 to place the springs 36 under tension. Once this is accomplished the latch is moved to engage the keeper 32 thereby locking the shaft 26 against rotation and the cable against unwinding.

A pair of rigid housings H are pivotally mounted on the ends of the shaft 15 so as to house the chains C when wound on the reels 20 and to thereby protect the chains against the accumulation of dust and dirt and the deteriorating action of the elements. Each housing is preferably of the tapered form shown in Fig. 3 with its narrow end open to allow the extension of the chain C therefrom when the latter is adapted to be put into use. Normally, however, the open end of the housing is closed by a plate 37 pivotally connected to the free end of the chain by one or more rings 38, and thus the housing is completely closed and the chain effectively protected when not in actual use.

The housings H provide an additional braking means for the wheels 19 as will be fully described hereinafter. When not performing this function they should be secured against movement to prevent rattling, and for this purpose springs 39 are riveted to the housings and to brackets 40 secured to the vehicle frame, for urging the housings forwardly into engagement with stop pins 41 secured in brackets 42 depending from the side members 17. The mounting of the chains C and the housings H in respect to the wheels 19, is such that they are disposed in the same vertical planes as the wheels in order that they may function to brake the wheels in the manner intended.

The operation of the emergency braking apparatus is as follows: Normally, the chains C are wound on the reels 20 by having rotated the shaft 15 through operation of the shaft 26 and to cause the closure plates 37 to close the open ends of the housings. Also by rotation of the shaft 15 the springs 36 have been placed under tension. In event the usual brakes of the vehicle fail to maintain the vehicle within the control of the operator when it is descending a steep grade, my braking apparatus may be brought instantly into use by moving the latch 34 to disengage the operator 32, thus permitting the springs 36 to rotate the shaft 15 in a counterclockwise direction as when viewed in Fig. 3 to unwind the chains C from the reels, and under the action of gravity to cause the chains to be extended from the housings onto the ground and directly in the paths of the wheels 19. As the vehicle proceeds forwardly the wheels 19 ride on to the chains so that the latter are interposed between the treads of the wheels and the surface of the roadway. Because of the irregular surfaces presented by the chains to the roadway and to the wheels, the wheels are locked against rotation. In consequence, the vehicle is either brought to a stop or its forward motion retarded depending upon the speed of travel of the vehicle at the time. Should the vehicle be travelling at a relatively high speed when the chains are applied to the wheels, there will be a skidding of the chains on the roadway, but the wheels will not be allowed to rotate so that ultimately the vehicle will be brought to a stop. Concurrently with movement of the chains to positions beneath the wheels, which causes the chains to be pulled rearwardly and completely unwound from the reels, the housings H are swung rearwardly against the tension of the springs 39 and into engagement with the treads of the wheels 19 with a pressure sufficient to set up a braking action which augments the braking action afforded by the chains.

Manifestly, to move the wheels 19 off of the chains following a brake application the vehicle is backed and the shaft 15 at the same time rotated to rewind the chains on the reels, and once the chains are removed from beneath the wheels the housings will be restored to their original advance positions under the action of the springs 39.

Referring now to Figs 7 and 8, I have here shown another form of emergency braking apparatus which is similar to the first form in that it employs a shaft 15a, torsion springs 36, a drum 23, and a cable 24 which when operated rotates the shaft to place the springs under tension and to rewind the chains on the reels. In this instance, however, the shaft 15a is journalled in brackets 41a secured to and depending from the side members 17 of the frame F so that the shaft is situated to the rear of the axle 18 for the wheels 19, instead of in advance of such axle as in the first form of my apparatus. Also, it is important to point out that the mounting of the shaft 15a is not only to the rear of the axle 18 but between the plane of the axle and the horizontal plane defined by the upper tread surfaces of the wheels.

Also, in this second form of my invention a pair of housings H1 are employed, not only to house the chains when not in use, but to engage the treads of the wheels to supplement the braking action of the chains. The housings H1 are of arcuate form to contact a greater length of wheel tread surface, and they are pivoted on the ends of the shaft 15a to occupy a lowered position, shown in solid lines in Fig. 7, in which they engage the treads of the wheels, and an elevated position, shown in broken lines in the same Figure, in which they are disengaged from the wheels to abut stops 42a secured to the side frame members 17. The housings are urged to this disengaged position by springs 43 secured to the housings and to brackets 44 on the frame F. Movement of the housings into engagement with the wheel treads is limited by lugs 45 fixed to the housings and engageable with stop brackets 46 secured to the brackets 41.

The operation of this form of braking apparatus is the same as the first form insofar as the chain C being normally wound on the reels and extendable onto the ground in the paths of the wheels 19 upon release of the shaft 15a, so that the wheels ride onto the chains as illustrated in Fig. 7. Also, concurrently therewith and under the pulling movement of the chains by the wheels, the housings H1 are brought into contact with the treads of the wheels to supplement the braking action of the chains.

Because the pivot 15a for the housings H1 is located to the rear of the axle 13 and below the tops of the wheels, the pulling force exerted by the chains C when beneath the wheels reacts on the pivot 15a in a tendency to thrust the rear end of the vehicle frame upwardly to counteract any tendency of the chains to distort or break the vehicle frame.

Although I have herein shown and described only two forms of emergency braking apparatus embodying my invention, it is to be understood that various changes and modifications may be made therein without departing from the spirit of my invention and the spirit and scope of the appended claims.

I claim:

1. An emergency braking apparatus for motor vehicles, comprising: a skid chain; rotatable means for supporting said chain in wound form on the vehicle; means tending to unwind said chain from said rotatable means to a position in which the chain is extended in the path of a wheel of the vehicle; manually controlled means for actuating said rotatable means to rewind said chain and to place the second mentioned means under tension; and means for latching said second mentioned means to restrain it against rotation of the first mentionel means.

2. An emergency braking apparatus for motor vehicles; comprising: a reel; a skid chain normally wound on said reel; means for supporting said reel on a vehicle so that when said chain is unwound therefrom it will be extended into the path of a wheel of a vehicle to lock the latter against rotation; a housing for said chain having an opening through which the chain may extend from the reel; and a member on said chain for closing said opening when the chain is wound on said reel.

3. An emergency braking apparatus for motor vehicles, comprising: a reel; a skid chain normally wound on said reel; means for supporting said reel on a vehicle so that when said chain is unwound therefrom it will be extended into the path of a wheel of a motor vehicle to lock the latter against rotation; manually operable means for rotating said reel to wind said chain thereon; spring means for rotating said reel to unwind said chain therefrom; and releasable means for restraining said spring means against actuating said reel.

4. An emergency braking apparatus for motor vehicles, comprising: a pair of reels; skid chains adapted to be wound on said reels; a shaft common to said reels; means for supporting said shaft upon the frame of a vehicle to so position said reels in relation to the rear wheels of the vehicle so that when said chains are unwound from the reels they will be disposed in the paths of said wheels so as to be extended beneath the latter for locking the wheels against rotation; spring means associated with said shaft to rotate the latter for unwinding said chains from said reels; and manually controlled means for restraining said spring means against actuation of said shaft.

5. In combination; a motor vehicle chassis; a shaft rotatably mounted on said chassis; reels fixed to said shaft; skid chains adapted to be wound on said reels and when unwound therefrom to be disposed in the paths of the rear wheels of said chassis for locking said wheels against rotation; cable means for rotating said shaft to cause said chains to be wound on said reels; springs associated with said shaft to be placed under tension by winding said chains on said reels and to actuate said shaft to unwind said chains from said reels when said cable means is released; and latching means for said cable means to restrain said shaft against rotation by said springs.

6. In combination; a motor vehicle chassis including a pair of traction wheels; a shaft mounted on the frame of said chassis in advance of said traction wheels; skid chains normally wound on the ends of said shaft; housings for said chains pivoted on the ends of said shaft to engage and disengage the treads of said wheels; means for urging said housings out of engagement with said wheels; and means for rotating said shaft to unwind said chains therefrom and into the paths of said wheels so as to be extended beneath the latter, whereby said housings are moved by said chains to engage the treads of said wheels.

7. A combination as embodied in claim 6, wherein members are secured to the free ends of said chains for closing said housings when said chains are wound on said shaft.

8. An emergency braking apparatus for motor vehicles, comprising: a reel; means for supporting said reel on a vehicle at a point above and to the rear of the axis of rotation of a traction wheel of the vehicle; and a skid chain normally wound on said reel but unwindable therefrom to be extended into the path tracked by the wheel for locking the latter against rotation.

9. An emergency braking apparatus for motor vehicles, comprising: a shaft; means for supporting said shaft transversely on a vehicle and to the rear and above the rear axle thereof; and a pair of skid chains normally wound on said shaft but simultaneously unwindable therefrom to extend into the paths tracked by the rear traction wheels of the vehicle for locking said wheels against rotation.

10. An emergency braking apparatus for motor vehicles, comprising: a reel; means for supporting said reel on a vehicle at a point above and to the rear of the axis of rotation of a traction wheel of the vehicle; a skid chain normally wound on said reel but unwindable therefrom to be extended into the path tracked by the wheel for locking the latter against rotation; means acting to unwind said chain from said reel; and manually controlled means for restraining said means from actuating said chain.

11. An emergency braking apparatus for motor vehicles, comprising: a shaft; means for supporting said shaft transversely on a vehicle and to the rear and above the rear axle thereof; a pair of skid chains normally wound on said shaft but simultaneously unwindable therefrom to extend into the paths tracked by the rear traction wheels of the vehicle for locking said wheels against rotation; means acting to rotate said shaft to simultaneously unwind said chains; and manually controlled means for restraining said means from actuating said shaft.

12. An emergency braking apparatus, comprising: a shaft; means for supporting said shaft transversely on a vehicle frame and to the rear and above the rear axle of the vehicle; a pair of reels fixed to said shaft in the vertical planes of the rear wheels of the vehicle; skid chains normally wound on said reels; housing for said reels pivoted on said shaft to engage and disengage the treads of said wheels; yieldable means for holding said housings out of engagement with said wheels; said housings having openings therein through which said chains are extendable when unwound from said reels to be disposed in the paths of said wheels so as to be disposed beneath the latter, whereby said housings are moved by said chains to engage the treads of said wheels.

13. A braking apparatus as embodied in claim 12, wherein manually controlled means is provided for rotating said shaft to actuate said reels for unwinding and winding said chains.

14. In combination with the rear traction wheels of a vehicle; flexible means movable in the path of said wheels so as to be interposed between the treads of said wheels and the ground for braking said wheels; and rigid means operable by said flexible means to engage the treads of said wheels to provide an additional braking means for said wheels.

15. A braking apparatus for wheeled vehicles, comprising: a flexible traction producing element; means for supporting said element in wound form on a vehicle; means tending to unwind said element from said means to a position in which the element is extended in the path of a wheel of the vehicle; and releasable means for retaining said element in wound form on said supporting means.

16. An emergency braking apparatus for motor vehicles, comprising: a skid chain; rotatable means for supporting said chain in wound form on the vehicle; means tending to unwind said chain from said rotatable means to a position in which the chain is extended in the path of a wheel of the vehicle; manually controlled means for actuating said rotatable means to rewind said chain and to place the second mentioned means under tension; and means for latching said second mentioned means to restrain it against rotation of the first mentioned means, said means including a fixed sleeve, a shaft rotatably fitted in said sleeve, a keeper on said sleeve, and a latch pivoted on said shaft to engage said keeper.

WILLIAM E. WREAD, Sr.